US010844735B2

(12) United States Patent
Cojande et al.

(10) Patent No.: US 10,844,735 B2
(45) Date of Patent: Nov. 24, 2020

(54) TURBOMACHINE GUIDE VANES WITH IMPROVED VANE PROFILE

(71) Applicant: SAFRAN AIRCRAFT ENGINES, Paris (FR)

(72) Inventors: Pradeep Cojande, Melun (FR); Hanna Reiss, Pontault-Combault (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 145 days.

(21) Appl. No.: 15/618,904

(22) Filed: Jun. 9, 2017

(65) Prior Publication Data
US 2017/0276004 A1   Sep. 28, 2017

Related U.S. Application Data

(63) Continuation of application No. 14/413,042, filed as application No. PCT/FR2013/051531 on Jun. 28, 2013, now abandoned.

(30) Foreign Application Priority Data

Jul. 6, 2012   (FR) ...................... 12 56532

(51) Int. Cl.
*F01D 9/04* (2006.01)
*F01D 1/04* (2006.01)
(Continued)

(52) U.S. Cl.
CPC .............. *F01D 9/04* (2013.01); *F01D 1/04* (2013.01); *F01D 5/141* (2013.01); *F01D 9/041* (2013.01);
(Continued)

(58) Field of Classification Search
CPC ... F01D 1/04; F01D 5/14; F01D 5/141; F01D 9/04; F01D 9/041; F04D 29/542;
(Continued)

(56) References Cited

U.S. PATENT DOCUMENTS 5,494,404 A   2/1996   Furseth et al.
5,547,342 A   8/1996   Furseth et al.
(Continued)

FOREIGN PATENT DOCUMENTS

EP   1 921 007 A2   5/2008
EP   1 921 007 A3   5/2008
(Continued)

OTHER PUBLICATIONS

International Search Report dated Sep. 27, 2013, in PCT/FR2013/051531, filed Jun. 28, 2013.
(Continued)

*Primary Examiner* — Kenneth Bomberg
*Assistant Examiner* — Julian B Getachew
(74) *Attorney, Agent, or Firm* — Oblon, McClelland, Maier & Neustadt, L.L.P.

(57) ABSTRACT

A set of turbomachine guide vanes including plural vanes arranged around an annulus, each vane having a leading edge extending between root and tip ends, the leading edge offset between these two ends being greater than 10% of the blade height. A tangential stacking of the guide vanes towards the suction face side, the curve of tangential stacking, of the position, in the direction tangential to the annulus, of centers of gravity of successive vane cross sections along the vane height, is a curve that increases constantly towards the suction face side. The curve, near the vane tip end, has an accentuated gradient towards the suction face side compared with the rest of the curve, and has a mean gradient near the vane tip end that is greater than at least 1.2 times the mean gradient of the curve over the portion between 30% and 90% of the vane height.

7 Claims, 6 Drawing Sheets (51) Int. Cl.
  *F04D 29/54* (2006.01)
  *F01D 5/14* (2006.01)

(52) U.S. Cl.
  CPC ........ *F04D 29/544* (2013.01); *F05B 2250/71* (2013.01); *F05D 2220/36* (2013.01); *F05D 2240/121* (2013.01); *Y02T 50/673* (2013.01)

(58) Field of Classification Search
  CPC ............... F04D 29/544; F05D 2220/36; F05D 2240/121; F05D 2250/71
  See application file for complete search history.

(56) References Cited

U.S. PATENT DOCUMENTS

| | | | |
|---|---|---|---|
| 5,569,019 | A | 10/1996 | Katariya et al. |
| 6,195,983 | B1 | 3/2001 | Wadia et al. |
| 7,547,186 | B2 | 6/2009 | Schuster et al. |
| 2005/0008494 | A1 | 1/2005 | Tsuchiya et al. |
| 2008/0135679 | A1 | 6/2008 | Udall |
| 2010/0329878 | A1 | 12/2010 | Bottome et al. |

FOREIGN PATENT DOCUMENTS

| | | |
|---|---|---|
| EP | 2 267 273 A2 | 12/2010 |
| EP | 2 267 273 A3 | 12/2010 |
| FR | 2 828 709 A1 | 2/2003 |
| WO | 95/17584 A1 | 6/1995 |

OTHER PUBLICATIONS

International Search Report and Written Opinion dated Sep. 27, 2013 in PCT/FR2013/051531 (with English Translation of Category of Cited Documents).

French Preliminary Search Report and Written Opinion dated Mar. 1, 2013 in FR1256532 (with English Translation of Category of Cited Documents).

TURBOMACHINE GUIDE VANES WITH IMPROVED VANE PROFILE

CROSS-REFERENCE OF RELATED APPLICATION

The present application is a continuation of U.S. patent application Ser. No. 14/413,042, filed Jan. 6, 2015, which is a continuation of International Application No. PCT/FR2013/051531, Jun. 28, 2013, and claims priority to French Patent Application No. 12-56532, filed Jul. 6, 2012, the entire contents of which are incorporated herein by reference.

FIELD OF THE INVENTION

The invention relates to the field of turbomachine straighteners and to turbomachines including such straighteners.

PRIOR ART

Figure 1:
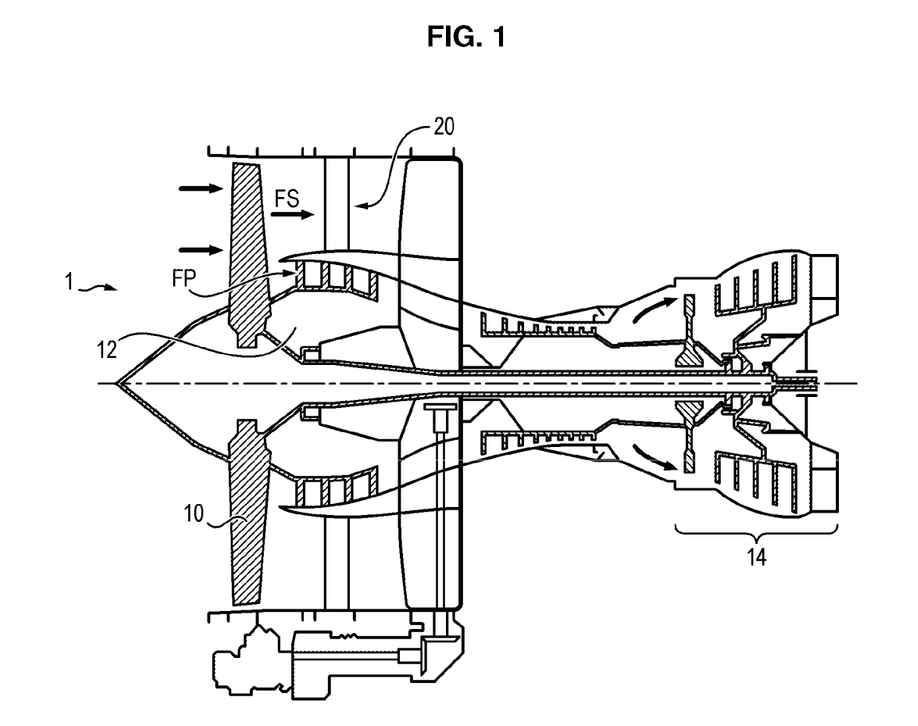
FIG. 1, already described, shows schematically a bypass type turbomachine.

A bypass turbomachine for aircraft propulsion is shown in FIG. 1. It includes a fan 10 delivering a stream of air of which a central portion, called the primary flow $F_P$, is injected into a compressor 12 which supplies a turbine 14 which drives the fan.

The peripheral portion, called the secondary flow $F_S$, of the air stream is for its part ejected into the atmosphere to supply a portion of the thrust of the turbomachine 1, after having passed through a ring of fixed vanes arranged downstream of the fan. This ring, called the straightener 20 (also known by the acronym OGV for "outlet guide vanes"), makes it possible to straighten the air flow leaving the fan while limiting losses as much as possible.

Indeed, reducing losses by 0.1% (pressure loss, for example) in the straightener can lead to a 0.2 point increase in efficiency of the assembly comprising the fan and the straightener, the correspondence between losses and efficiency depending naturally on the engine and the aerodynamic loading of the associated fan.

The effectiveness of the straightener depends in particular on the gradients of certain physical quantities of the air flow leaving the fan, as a function of the distance from the axis of the turbomachine. This is what is called the feeding of the straightener by the fan. These physical quantities are for example the flow rate of the air, its compression ratio or its temperature.

Straightening of the air flow is provided by the vanes of the straightener, the arrangement and geometry whereof are adapted to this feeding. In the course of developments in this field, the first straightener vanes were two-dimensional, with a substantially rectangular shape. However, these geometries are not compatible with loss improvement and size reduction required by new designs. Three-dimensional straightener vane profiles have therefore been developed, as for example in document FR 2 828 709.

New straightener feeding profiles have moreover led to the pursuit of straightener designs along these lines.

In particular, a straightener was proposed in document US 2005/008494 with vanes extending radially about the axis of revolution of the straightener, and having a tip end tilted at an angle comprised between 27 and 33 degrees from the radial direction, this in order to reduce the noise generated by the fan positioned upstream of the straightener.

However, the straightener proposed in this document does not make it possible to improve the distribution of air flow within the straightener stream, nor to reduce losses.

PRESENTATION OF THE INVENTION

The invention has the goal of proposing a straightener, the vanes whereof have a geometry suited for correcting at least one of the aforementioned shortcomings.

In this regard, the invention has as its object a turbomachine straightener, comprising a plurality of vanes arranged about a ring centered on an axis of the turbomachine, each vane having a leading edge and extending between a root end and a tip end, the leading edge at the root end of each vane being situated upstream of the leading edge at the tip end of the vane relative to the air flow, the offset of the leading edge between these two ends being greater than 10% of the height of the vane, measured in the direction of the turbomachine axis, the straightener being characterized in that the tangential stacking curve, consisting of the position, in the direction tangential to the ring, of the centers of gravity of the successive vane sections in the height of the vane, is a curve that is constantly increasing toward the extrados of the vane, in that said curve has, in proximity to the tip end of a vane, a slope toward the extrados that is increased compared to the rest of said curve, and in that the mean slope of the curve in proximity to the tip end of the vane is greater than at least 1.2 times the slope of the curve in the portion comprised between 30% and 90% of the height of the vane.

Advantageously, but optionally, the invention also has at least one of the following features:
- the curved portion in proximity to the tip end is comprised between 90% to and 100% of the height of the vane.
- the leading edge of each vane includes at least one portion located downstream of the position of the leading edge at the tip end of the vane relative to the direction of air flow.
- the portion downstream of the leading edge at the tip end of the vane is is included in a region of the leading edge situated between 60 and 100% of the vane height.
- the point of the leading edge positioned in line with the position of the leading edge at the tip end of the vane is situated between 60 and 80% of the vane height.
- the leading edge at the root end of each vane is situated upstream of the leading edge at the tip end of the vane with respect to the air flow direction by a distance comprised between 12 and 20% of the vane height, the distance being measured in the direction of the turbomachine axis.

The invention also relates to a turbomachine including at least one straightener according to the invention.

DESCRIPTION OF THE FIGURES

Other features, aims and advantages of the invention will emerge from the description that follows, which is purely illustrative and not limiting, and which must be read with reference to the appended drawings wherein.

DETAILED DESCRIPTION OF AT LEAST ONE EMBODIMENT

With reference to FIG. 1, a bypass turbomachine 1 has, as described previously, a fan 10 and a straightener 20 of the OGV type, to straighten a secondary air flow $F_S$ coming from the fan.

Figure 2A:
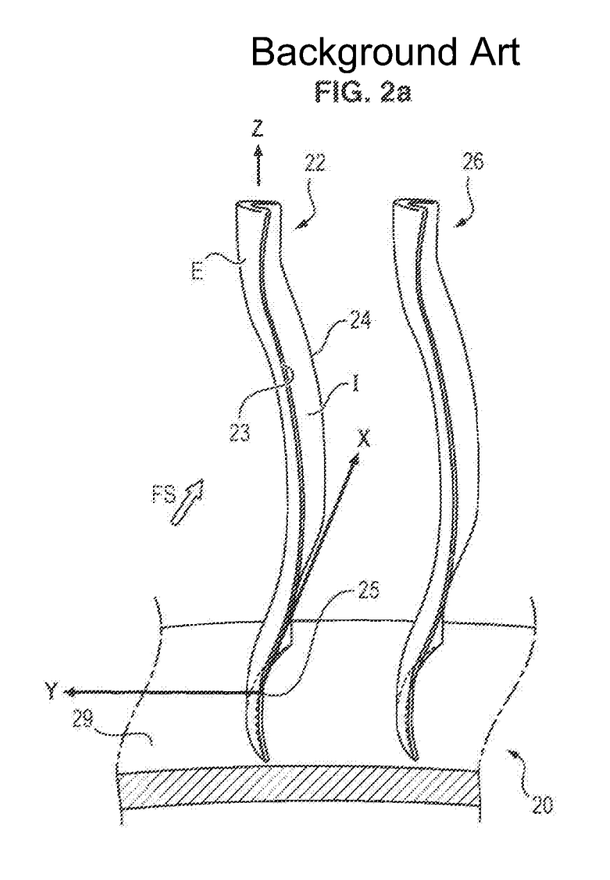
FIG. 2a is a partial schematic view of a straightener.
Figure 2B:
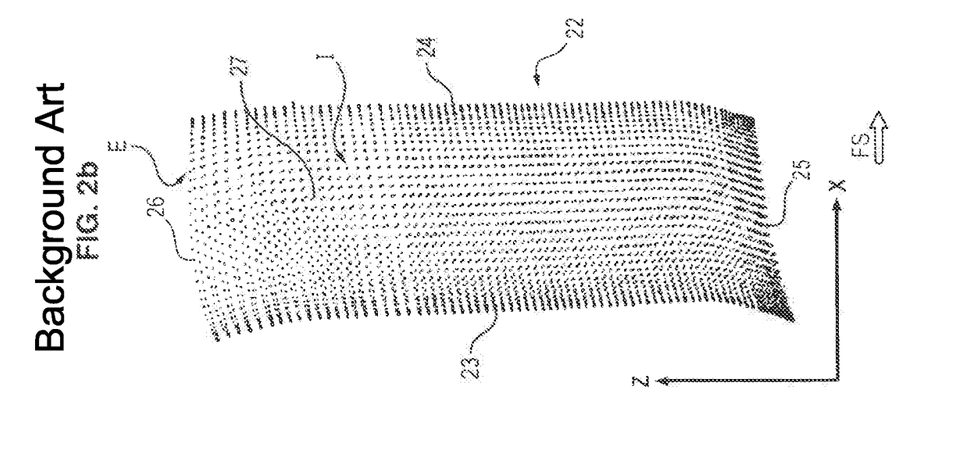
FIG. 2b shows the outline of a straightener vane consisting of a plurality of vane sections.

With reference to FIG. 2a, the straightener 20 includes a plurality of vanes 22 evenly distributed around a ring 29 centered on the axis of the turbomachine (not shown in the figure). The vanes shown in FIGS. 2a and 2b are not representative of the geometry adopted by the invention.

Each vane 22 includes a leading edge 23, and a trailing edge 24, extending between a radially inward end 25, called the root of the vane, and a radially outward end 26, called the tip of the vane. The leading edge 23 the trailing edge 24 delimit an intrados I and an extrados E.

The following notation is also used: X is the direction of the axis of the turbomachine or engine axis, Y is the tangential direction relative to the ring 29 of the straightener, and Z is the radial direction, along which each vane extends.

Forward Shift of the Leading Edge at the Vane Root

Figure 3A:
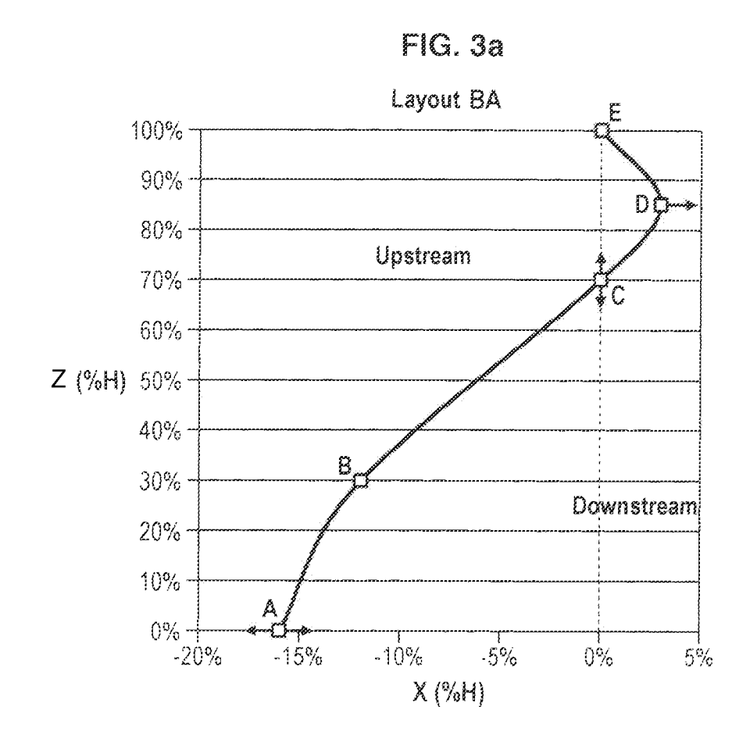
FIG. 3a shows the evolution of the layout of the leading edge of a vane relative to the air flow direction in the turbomachine.

With reference to FIG. 3a, the position of the leading edge is shown at every point on the vane, relative to the direction X of the engine axis. This curve is called the layout of the leading edge.

In addition, all distances have been non-dimensionalized based on the height of the vane: thus the ordinate represents the height position of the leading edge relative to the total height of the vane, and the abscissa represents the offset of the leading edge, as a percentage of the vane height, relative to the position E of the leading edge at the tip end 26 of the vane.

As can be seen in the figure, the position A of the leading edge at the root end 25 of the vane is offset upstream, in the direction X of the engine axis, relative to the position E of the leading edge at the tip end 26 of the vane. This offset is greater than 10% of the height of the vane. It is preferably comprised between 10 and 20% of the height of the vane, advantageously comprised between 12 and 20% of the vane height, and even more advantageously comprised between 15 and 20%.

Figure 4A:
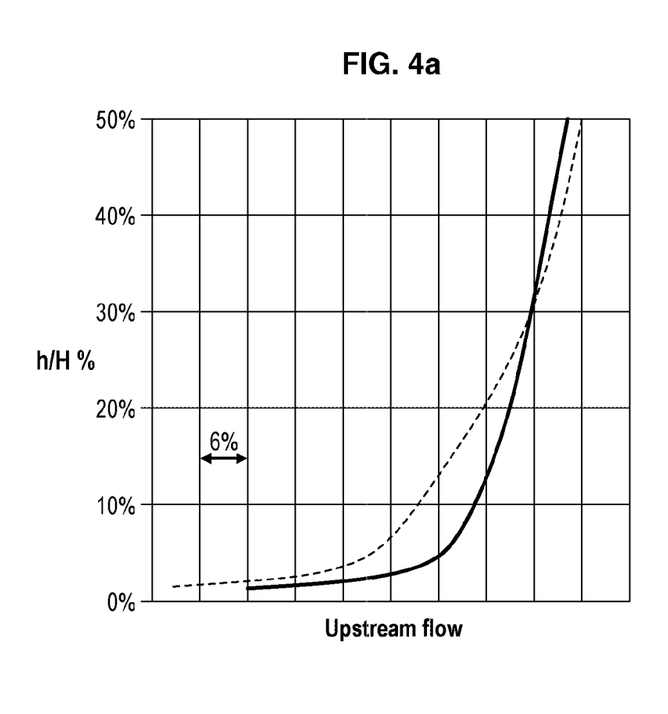
FIG. 4a shows on the one hand, for vane conforming to one embodiment of the invention (solid curve), and on the other hand for another vane with two-dimensional geometry (dotted curve) the distribution of air flow rate along the height of the vane, at the vane root.

This forward shift of the root of the vane allows a better distribution of the air flow over the height of the blade. This distribution of the value of the air flow is shown in FIG. 4a, along the height of the vane, for a portion extending between the root end of the vane and 50% of the height thereof.

Figure 4B:
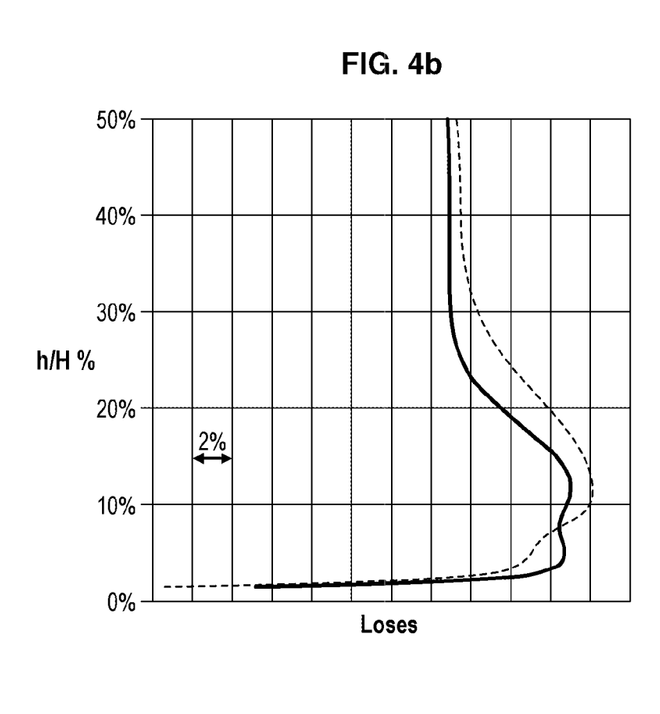
FIG. 4b shows, for one and the other of these two vanes, the pressure losses of the air in passing the vane along the height of the vane, at the vane root.
Figure 4C:
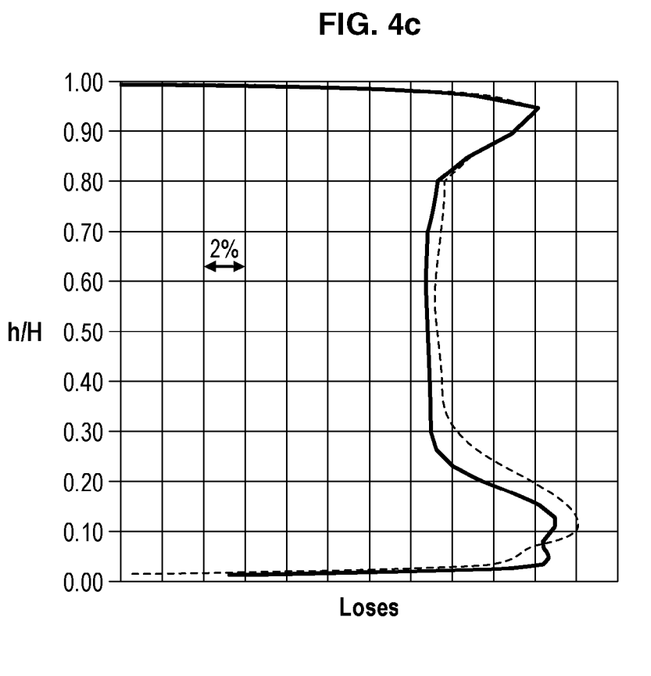
FIG. 4c shows, for one and the other of these two vanes, the evolution of is the air pressure losses in passing the vane along the entire height of the vane.

Much better performance is observed, for the proposed vane (corresponding the solid curves in FIGS. 4a to 4c), than for other vanes and in particular those of the prior art (dotted curves). In particular, at 10% of the vane height, it is observed that the proposed profile allows a flow increase of more than 6%.

Tangential Stacking Toward the Extrados

With reference to FIG. 2b, each vane 22 consists conventionally of a stack of consecutive vane sections 27 within the height of the vane.

Figure 3B:
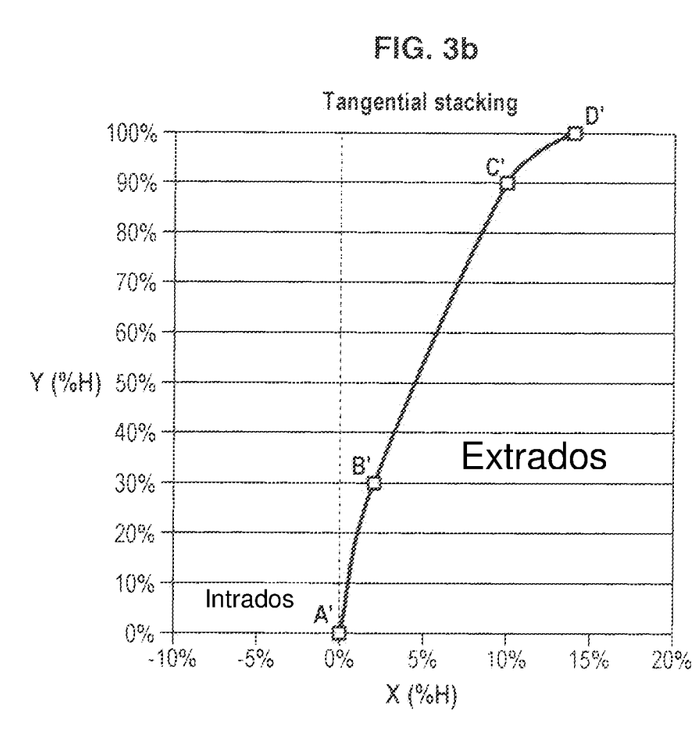
FIG. 3b shows the stacking curve relative to the tangential direction of the straightener.

With reference to FIG. 3b, the tangential stacking curve of a vane is shown, consisting of the position, relative to the direction Y tangential to the ring 29, of the centers of gravity of the vane sections 27.

This curve is also non-dimensionalized using the height of the vane, the origin being taken to be the position A' of the center of gravity of the vane root section. In addition, positive abscissa values correspond to an offset toward the extrados of the vane, while negative values correspond to an offset toward the intrados of the vane.

As can be seen in FIG. 3b, the tangential stacking curve is a curve that is constantly increasing toward the extrados of the vane. This tangential stacking toward the extrados allows a reduction in separation of the air flow at the vane tip, an increase in the speed and the flow rate at the vane root, and a reduction in pressure losses in this region. In particular, it is observed in FIG. 4b that the losses at the vane root can be reduced by nearly 2% thanks to the proposed vane profile.

Advantageously, the forward shift of the leading edge of a vane at the vane root is combined with tangential stacking of the vane toward the extrados to combine the effects obtained and to reduce pressure losses as much as possible.

Moreover, returning to FIG. 3b, the tangential stacking curve of the vane advantageously has an increased slope, in proximity to the tip of the vane, compared to the rest of the vane.

Preferably, the curve has a portion C'D', situated in the region comprised between 90 and 100% of the vane height, such that the average slope of this portion, that is the average slope of the segment C'D', is at least 1.2 times that of the portion B'C' comprised between 30% and 90% of the vane height.

An air stream passing a vane with tangential stacking toward the intrados has been simulated, and an air stream passing a vane with tangential stacking toward the extrados, with a slope increase at the vane tip.

Figure 5A:
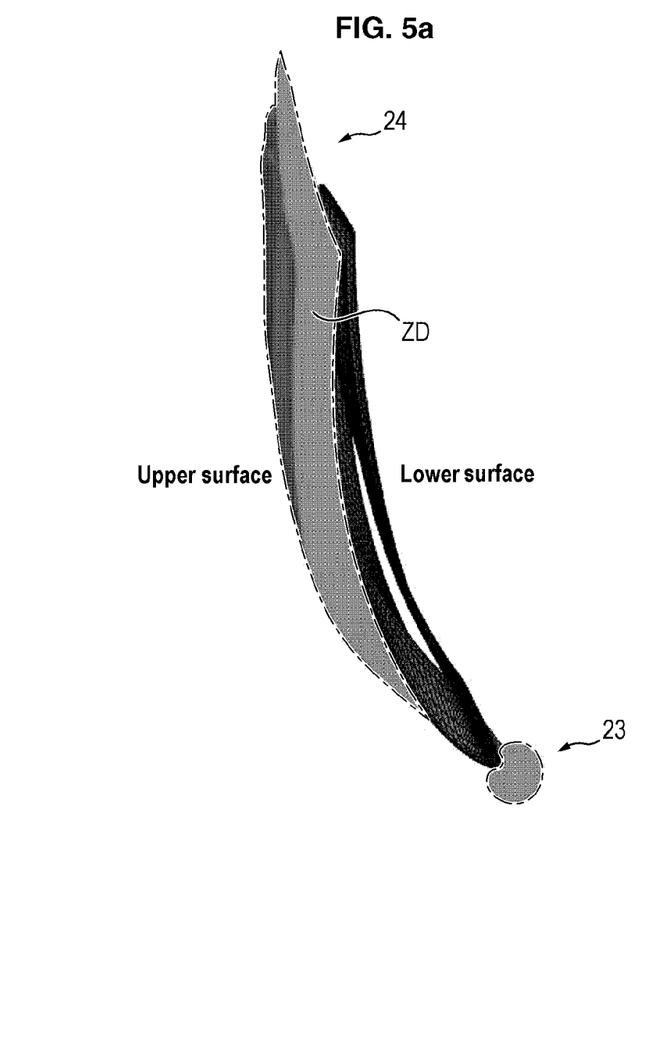
FIGS. 5a and 5b show separation at the tip of a blade, respectively according to the prior art and according to the invention.
Figure 5B:
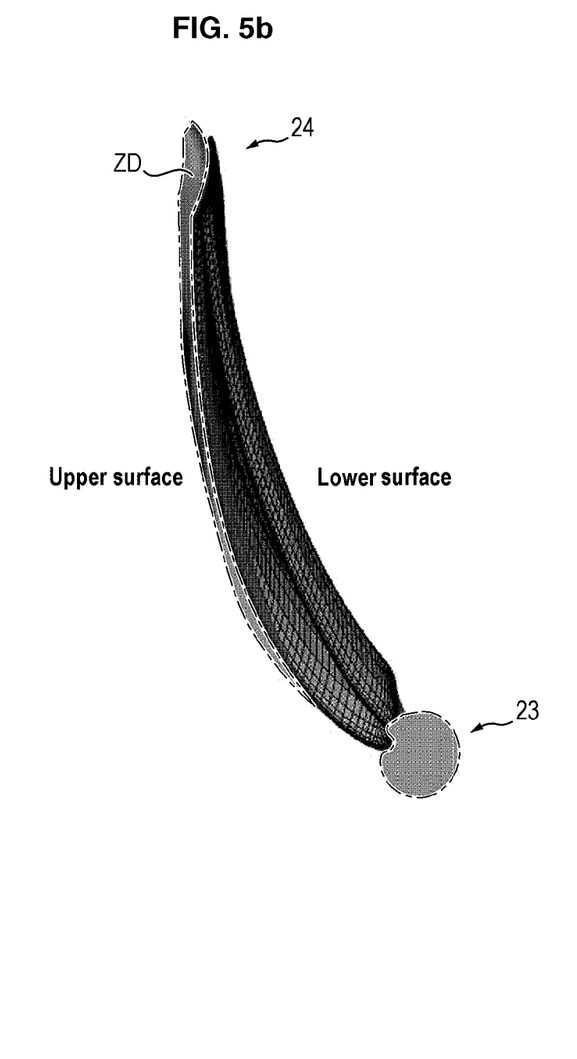

The results are illustrated respectively in FIGS. 5a and 5b, each of which shows a vane 22 and a separation region ZD of the air flow at the vane tip. It is noted that, for the first vane, in FIG. 5a, this separation region ZD is much larger than for the second, conforming to the invention, of FIG. 5b.

Finally, returning to FIG. 3a, the layout of the leading edge of a vane also has a portion situated downstream of the position E of the leading edge at the vane tip with respect to the direction X of the engine axis.

Thus there exists a point C of the leading edge situated in line with the position E of the leading edge at the vane tip. This point is advantageously located between 60 and 80% of the vane height, so that the portion situated downstream of the position E extends for its part into the region comprised between 60 and 100% of the vane height.

The point C can more preferably be situated between 65 and 75% of the vane height.

The respective positions of points A, C and E therefore imply that the layout of the leading edge of the vane has, in proximity to the tip of the vane, a hook shape, with a concavity opening upstream with respect to the engine axis.

This portion of the vane in proximity to the tip of the vane is thus more distant from the turbomachine fan than the rest of the vane, which makes it possible to limit acoustic perturbations at the vane tip.

The proposed geometry thus makes it possible to improve the performance of a straightener vane and to reduce separation of the air stream at the vane tip.

The invention claimed is:

1. A straightener of a turbomachine, comprising:
a plurality of vanes arranged around a ring centered on an axis of the turbomachine, each vane including a leading edge and extending between a root end and a tip end,
the leading edge at the root end of each vane being situated upstream of the leading edge at the tip end of each vane, relative to an air flow direction, an offset of the leading edge between the root end and the tip end being greater than 10% of a height of each vane, measured in a direction of the axis of the turbomachine,
a tangential stacking curve, of a position, in a tangential direction of the ring, of centers of gravity of consecutive vane sections of each vane along the height of each vane from the root end to the tip end of each vane, is a monotonic function increasing toward an extrados of each vane,
the curve has, in proximity to the tip end of each vane, a first portion with an increased slope toward the extrados compared to a rest of the curve, and the curve has an average slope in proximity to the tip end of each vane greater than at least 1.2 times the average slope of the curve on a second portion of the curve between 30% and 90% of the vane height.

2. The turbomachine straightener according to claim 1, wherein the first portion of the curve in proximity to the tip end is between 90% and 100% of the vane height.

3. The turbomachine straightener according to claim 1, wherein the leading edge of each vane includes at least one portion located downstream of a position of the leading edge at the tip end of the vane with respect to the direction of the air flow.

4. The turbomachine straightener according to claim 3, wherein the at least one portion of the leading edge located downstream of the position of the leading edge at the tip end of the vane with respect to the direction of the air flow is included in a region of the leading edge situated between 60% and 100% of the height of the vane.

5. The turbomachine straightener according to claim 3, wherein a point of the leading edge positioned in line with a position of the leading edge at the tip end of the vane is situated between 60% and 80% of the vane height.

6. The turbomachine straightener according to claim 1, wherein the leading edge at the root end of each vane is situated upstream of the leading edge at the tip end of the vane with respect to the air flow direction by a distance between 10% and 20% of the vane height, or between 12% and 20% of the vane height, the distance being measured in the direction of the axis of the turbomachine.

7. A turbomachine comprising at least one straightener according to claim 1.

* * * * *